United States Patent [19]

Adair

[11] Patent Number: 5,622,122
[45] Date of Patent: Apr. 22, 1997

[54] GARDEN TOOL FOR PLANTING PLANTS

[76] Inventor: Newell Adair, 3558 Kline Rd., Rootstown, Ohio 44272

[21] Appl. No.: 585,881

[22] Filed: Jan. 16, 1996

[51] Int. Cl.⁶ ..................................... A01C 11/00
[52] U.S. Cl. .............................. 111/106; 111/100; 47/1.01
[58] Field of Search ............................. 47/1.01; 111/104, 111/105, 107, 106, 108, 100

[56] References Cited

U.S. PATENT DOCUMENTS

| 1,773,452 | 8/1930 | Etchison | 111/108 |
|---|---|---|---|
| 2,195,765 | 4/1940 | Caulk | 111/108 |
| 3,604,377 | 9/1971 | Smith . | |
| 3,765,347 | 10/1973 | Tormstrom . | |
| 3,797,417 | 3/1974 | Hahn . | |
| 4,191,116 | 3/1980 | Allison, Jr. et al. . | |
| 4,706,582 | 11/1987 | Keskilohko . | |
| 5,040,471 | 8/1991 | Lamont, Jr. | 111/108 |
| 5,052,314 | 10/1991 | Leini . | |
| 5,142,816 | 9/1992 | Tetenburg | 47/1 A |
| 5,228,400 | 7/1993 | Luke . | |
| 5,241,917 | 9/1993 | Ferrand . | |
| 5,247,761 | 9/1993 | Miles et al. | 111/104 X |
| 5,254,140 | 10/1993 | Huang | 47/1 A |
| 5,265,546 | 11/1993 | Sheeter . | |
| 5,398,624 | 3/1995 | Caron . | |
| 5,445,089 | 8/1995 | Adair | 47/1 A X |

Primary Examiner—Terry Lee Melius
Assistant Examiner—Christopher J. Novosad
Attorney, Agent, or Firm—Oldham & Oldham Co., LPA

[57] ABSTRACT

A garden tool tool to assist a gardener in planting plants in previously cultivated soil. The garden tool allows a gardener to plant plants such as vegetables, flowers, and tree seedlings in cultivated soil with a minimum of effort and without kneeling or bending over. Also, once the plant is inserted into the soil, the garden tool provides a simple and effective mechanism for a gardener to provide the newly planted plant with a quantity of water and/or fertilizer. The garden tool includes an elongated planting member having a bore formed therethrough connecting an upper open end of the planting member to a lower open end of the planting member. A plant carrying tray is connected to the upper open end of the planting member and provides a surface for supporting a plurality of plants to be planted using the tool. The tool may include one or more tanks to be filled with water, fertilizer and the like such that each newly planted plant can be watered immediately upon planting. The garden tool may also include a plant positioning guide to assist an operator of the apparatus in properly locating a plant relative to an adjacent plant. Also, the garden tool conveniently folds for storage and transport.

14 Claims, 4 Drawing Sheets

# 5,622,122

GARDEN TOOL FOR PLANTING PLANTS

FIELD OF INVENTION

The present invention relates to a garden tool, and more particularly to a garden tool to assist a gardener in planting plants in previously cultivated soil. Specifically, the garden tool of the present invention allows a gardener to plant plants such as vegetables, flowers, and tree seedlings in cultivated soil with a minimum of effort and without kneeling or bending over. Also, once the plant is inserted into the soil, the garden tool of the present invention provides a simple and effective means for a gardener to provide the newly planted plant with a quantity of water and/or fertilizer.

BACKGROUND OF THE INVENTION

The planting of plants such as vegetables, flowers, and tree seedlings is a tedious and arduous task, even when the soil into which the plants are being inserted has been previously tilled or cultivated. The most tiring aspect of the planting operation arises from the fact that one must repeatedly bend over and/or kneel for long periods of time. This is compounded by the fact that planting often occurs in the hot sun.

Another difficulty that gardeners encounter during planting operations is the lack of a convenient apparatus for carrying the plants that are to be planted. Plants frequently are provided in plastic trays which include partitions dividing the tray into a plurality of cells or sections, each of which holds a plant to be planted. While these trays function well as a place in which to grow a plant from a seed, the trays are not easily carried by one planting the plants.

Aside from considerations relating to the gardener, it is also believed that a newly planted plant will have a much better chance for survival if the plant is promptly watered and/or fertilized after being planted. Typically, once a garden has been planted, the gardener will either water the entire garden with a hose or a sprinkler-type irrigation device, an indiscriminate approach which leads to an abundance of weeds, or the gardener will individually water each newly planted plant with a watering can or similar apparatus, a process which is tiring and time consuming. Also, because it will often take several hours to plant a garden or a substantial section thereof, some of the plants may have to wait an excessively long time before receiving water and/or fertilizer.

Another problem associated with prior methods and apparatus for planting plants is the lack of an effective mechanism by which the gardener can judge whether or not each plant is being planted in a suitably straight row and evenly spaced from the adjacent rows. Aside from being aesthetically pleasing, planting plants in straight rows, an equal distance from adjacent rows, provides a garden that is easier to weed and otherwise maintain. Also, if each plant is spaced a consistent distance from adjacent plants, the plants are more likely to receive a more uniform amount of light and water, resulting in a more consistent harvest of the plants themselves, and/or the fruits, vegetables, and flowers thereof.

SUMMARY OF THE INVENTION

The present invention is therefore directed to an apparatus for planting plants comprising an elongated planting tube or member having a bore formed therethrough connecting an upper open end of the planting member to a lower open end of the planting member. A plant carrying tray is connected, preferably with by a hinged connection, to the upper open end of the member and provides a surface for supporting a plurality of plants to be planted using the apparatus. The apparatus also may comprise one or more tanks to be filled with water, fertilizer and the like. The one or more tanks are adapted to dispense a portion of their contents onto a newly planted plant in response to the opening of a valve or the like by the operator of the apparatus. The apparatus of the present invention may also comprise a plant positioning guide to assist an operator of the apparatus in properly locating a plant relative to an adjacent plant or other reference point.

In operation, the lower end of the elongated planting member is forced into the cultivated soil of a garden or the like to form a depression. The member is left in this position and a plant is taken from the plant carrying tray and inserted into the open upper end of the planting member such that it slides downward through the bore formed in the member and comes to rest in the depression formed in the cultivated soil. The gardener may then cause a quantity of water and/or fertilizer to be dispensed on the roots of the plant using the apparatus of the present invention. Finally, the lower end of the planting member is withdrawn from the cultivated soil, leaving the newly planted plant behind. The gardener may use his or her foot to push dirt around the roots of the plant to ensure that the plant is properly planted.

The present invention solves the above-noted and other problems associated with planting plants. Several advantages are associated with the present invention including the provision of a storage location for the plants that are to be planted, the provision of an integral tank for containing water and fertilizer, and the provision of a mechanism by which plants may be properly located adjacent to other plants with a minimum of effort. Also, the present invention conveniently folds for storage and transport.

DETAILED DESCRIPTION OF THE INVENTION

Figure 1:
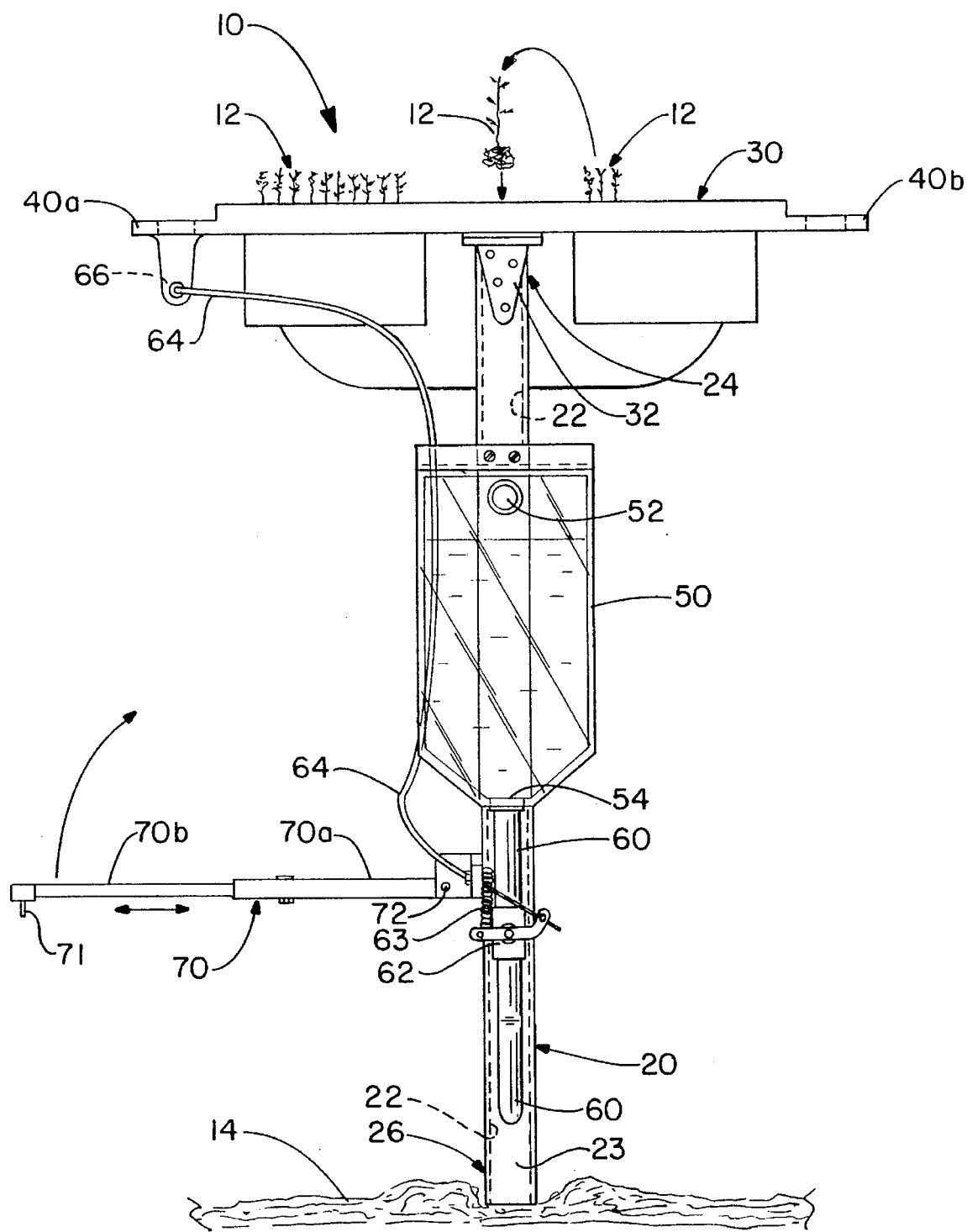
FIG. 1 is a front elevational view showing a garden tool in accordance with the present invention in its operative position.

Reference will now be made in detail to the present preferred embodiments of the invention, examples of which are illustrated in the accompanying drawings. Wherever possible, the same reference numbers will be used throughout the drawings to refer to the same or like parts.

A garden tool in accordance with the present invention is shown generally in the Figs. at 10 and comprises an elongated planting tube or member 20 having an upper end 24 and a lower end 26. Elongated planting member 20 includes a bore 22 formed therethrough from end 24 to end 26, such that each end 24, 26 is open to bore 22. Planting member 20 and bore 22 formed therethrough may be provided with a circular cross-section or any cross-sectional shape and size desired. As shown, both planting member 20 and bore 22 formed therethrough have a rectangular cross-section.

Upper end 24 of planting member 20 includes a plant carrying tray 30 connected thereto. Plant carrying tray 30 may be connected to member 20 by any suitable means, although it is thought preferable to utilize a hinge 32 as shown, in conjunction with a suitable latch mechanism 34 which includes first and second latch elements 34a, 34b, thereby allowing plant carrying tray 30 to be rotated between an operative position (FIGS. 1, 2, 3, 5) whereby the plant carrying tray 30 is generally perpendicular to member 20, providing a substantially horizontal surface, and a storage position (FIG. 4) whereby plant carrying tray 30 is rotated 90° to lie adjacent to a portion of elongated planting member 20. As may be seen most clearly in FIG. 5, latch 34 provides a means for securing plant tray 30 in its operative position through the selective engagement of latch member 34a with latch member 34b.

Plant carrying tray 30 may be substantially planar to provide a support surface for plants 12 but preferably includes one or more recesses 36 to accommodate a plurality of plants 12 therein as is shown in FIG. 1. Recesses 36, which may be a fraction of an inch to several inches deep as shown, prevent plants 12 from sliding or being knocked off of tray 30 during planting operations. The garden tool 10 also includes handles by which a gardener or other operator may grasp the apparatus 10. In the preferred embodiment shown herein, tray 30 includes hand grips 40a, 40b formed directly therein on opposite sides thereof, such that an operator of the apparatus 10 may grasp the tray 30 for planting operations as is discussed in more detail below. Tray 30 also includes an aperture 38 formed therethrough which preferably has dimensions corresponding to the cross-sectional size and shape of bore 22 formed through planting member 20. Aperture 38 is formed through tray 30 at a location as shown such that aperture 38 is in registry with bore 22 formed through planting member 20 at upper end 24 of member 20, when tray 30 is in its operative position. In this manner, tray 30 does not block open bore 22 at upper end 24 of member 20 when in its operative position during planting operations as discussed below.

Figure 2:
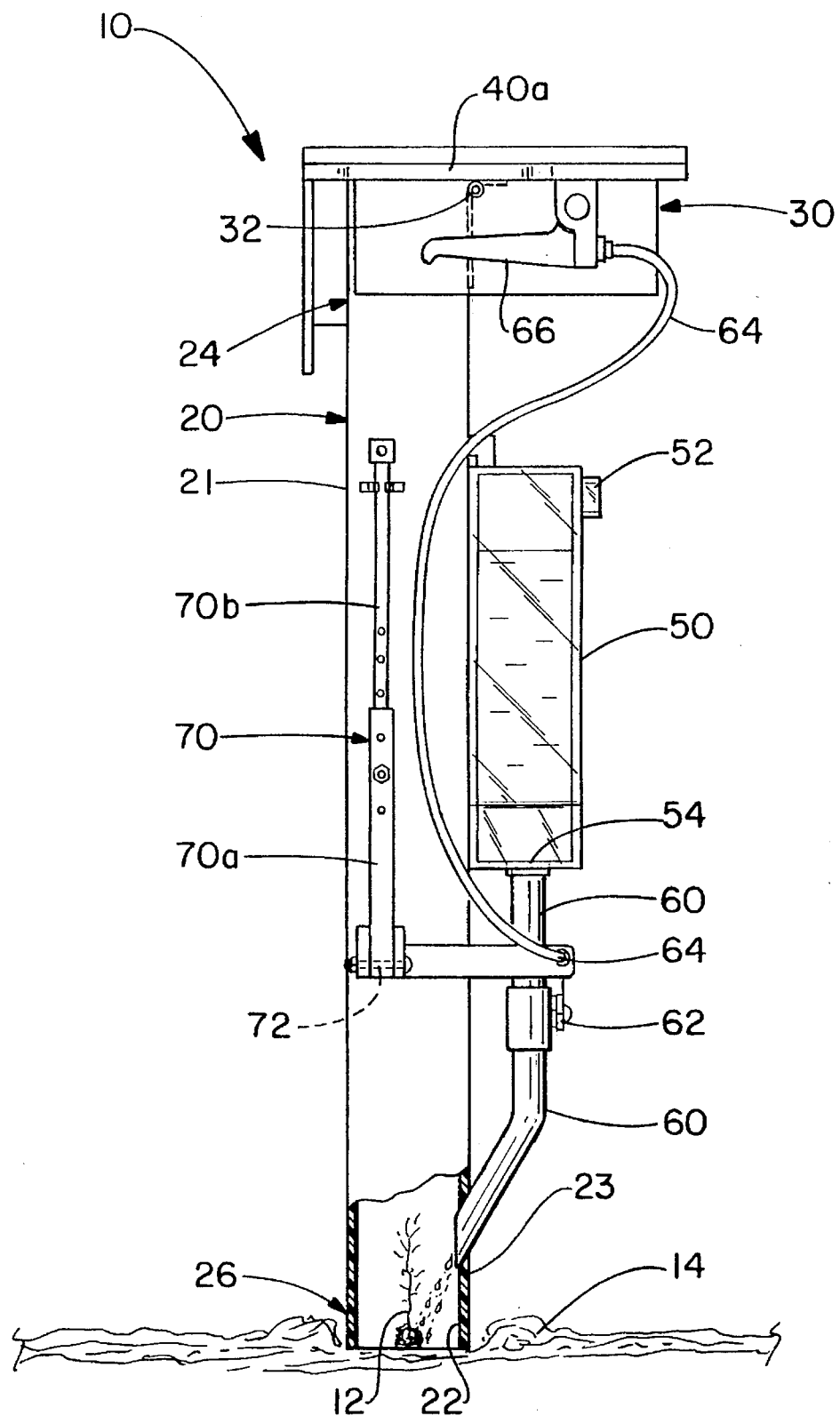
FIG. 2 is a side view showing a garden tool in accordance with the present invention in its operative position.
Figure 3:
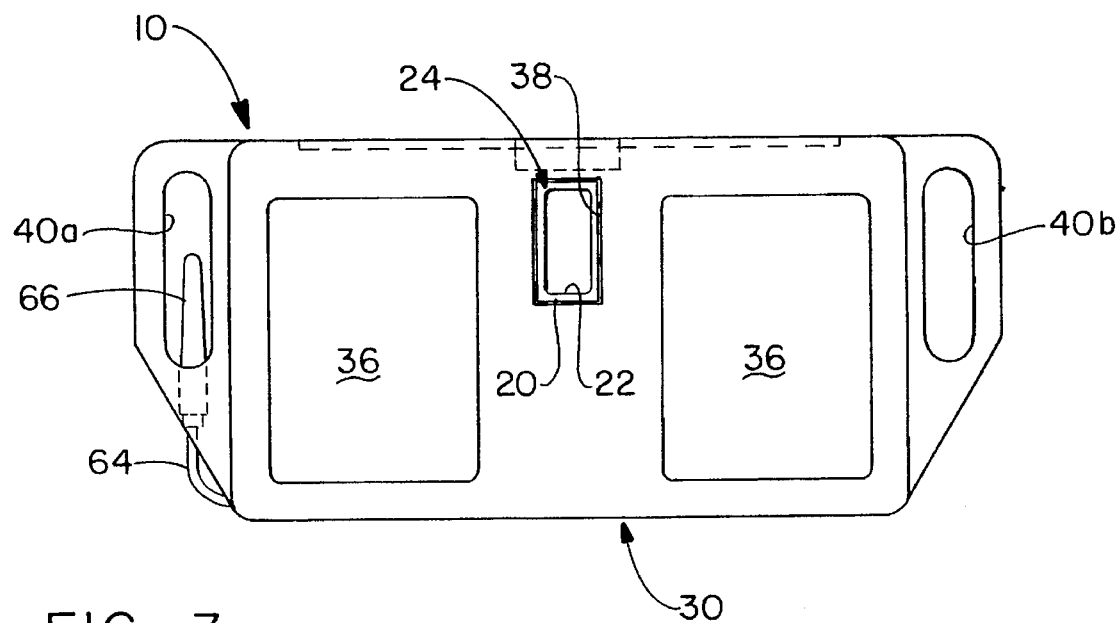
FIG. 3 is a top view showing a garden tool in accordance with the present invention in its operative position.

The garden tool 10 in accordance with the present invention also preferably includes one or more tanks for containing water or another substance to be delivered to a plant 12 that has been planted using the garden tool 10. For example, as shown herein, the apparatus 10 includes a liquid carrying tank 50 connected to the planting member 20 for containing a quantity of water, a mixture of fertilizer and water, or any other liquid. Alternatively, a tank for containing a dry substance such as a powdered or granular fertilizer may be provided. Tank 50 includes an inlet 52 through which liquid may be introduced into the tank 50, and an outlet 54 through which liquid may exit the tank 50. Outlet 54 of tank is connected by a conduit such as a pipe 60 to lower portion 26 of planting member 20. Pipe 60 extends from outlet 54 of tank 50, downward toward lower end 26 of planting member 20, and through an outer wall 23 of member 20, such that pipe 60 may selectively convey fluid from outlet 54 of tank 50 to a recently planted plant 12 located within bore 22 at lower end 26 of planting member 20 as is shown in FIG. 2. To control the flow of liquid from tank 50 through pipe 60, a valve 62 is provided to selectively block and unblock fluid communication through pipe 60 from outlet 54 of tank 50. Valve 62 may be any suitable valve and may be controlled by a wide variety of means. As shown, valve 62 is operatively connected to a lever 66 using a cable 64. Lever 66 is preferably positioned adjacent to a handgrip 40a, 40b such that an operator of the apparatus 10 may operate the lever 66 with his or her outstretched fingers, without removing his or her grip from the tray 30. Upon operation of the lever 66, cable 64 is tightened, causing valve 62 to open, thereby allowing fluid to flow from outlet 54 of tank 50 into bore 22 and onto a newly planted plant 12 through pipe 60 as is shown in FIG. 2. In the example shown, valve 62 will remain open until the lever 66 is released and returned to its original starting position, thereby closing the valve 62. A spring 63 is provided such that valve 62 will automatically close when the lever 66 is released by the operator. Alternatively, a metering valve may be provided in place of valve 62 and configured to release an exact amount of water or fertilizer onto a newly planted plant 12.

Figure 4:
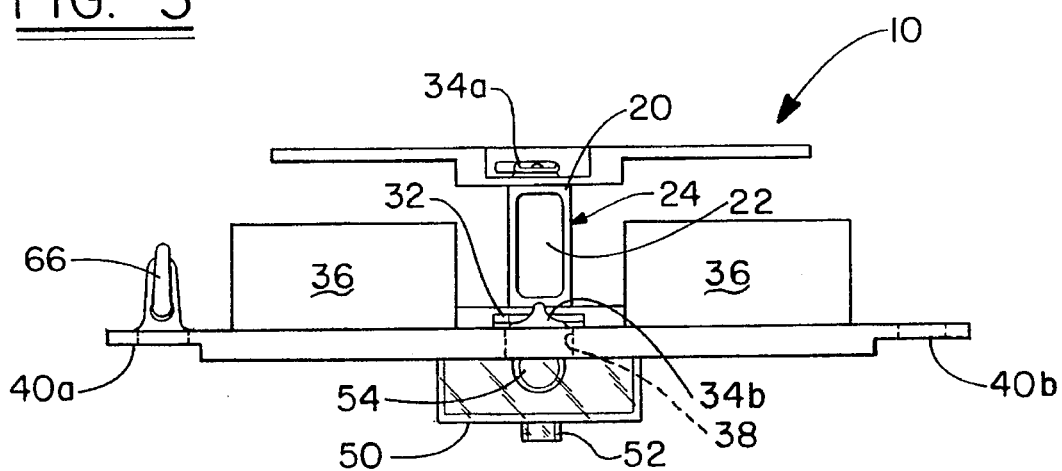
FIG. 4 is a top view showing a garden tool in accordance with the present invention with the plant carrying tray rotated 90° to a storage position.
Figure 5:
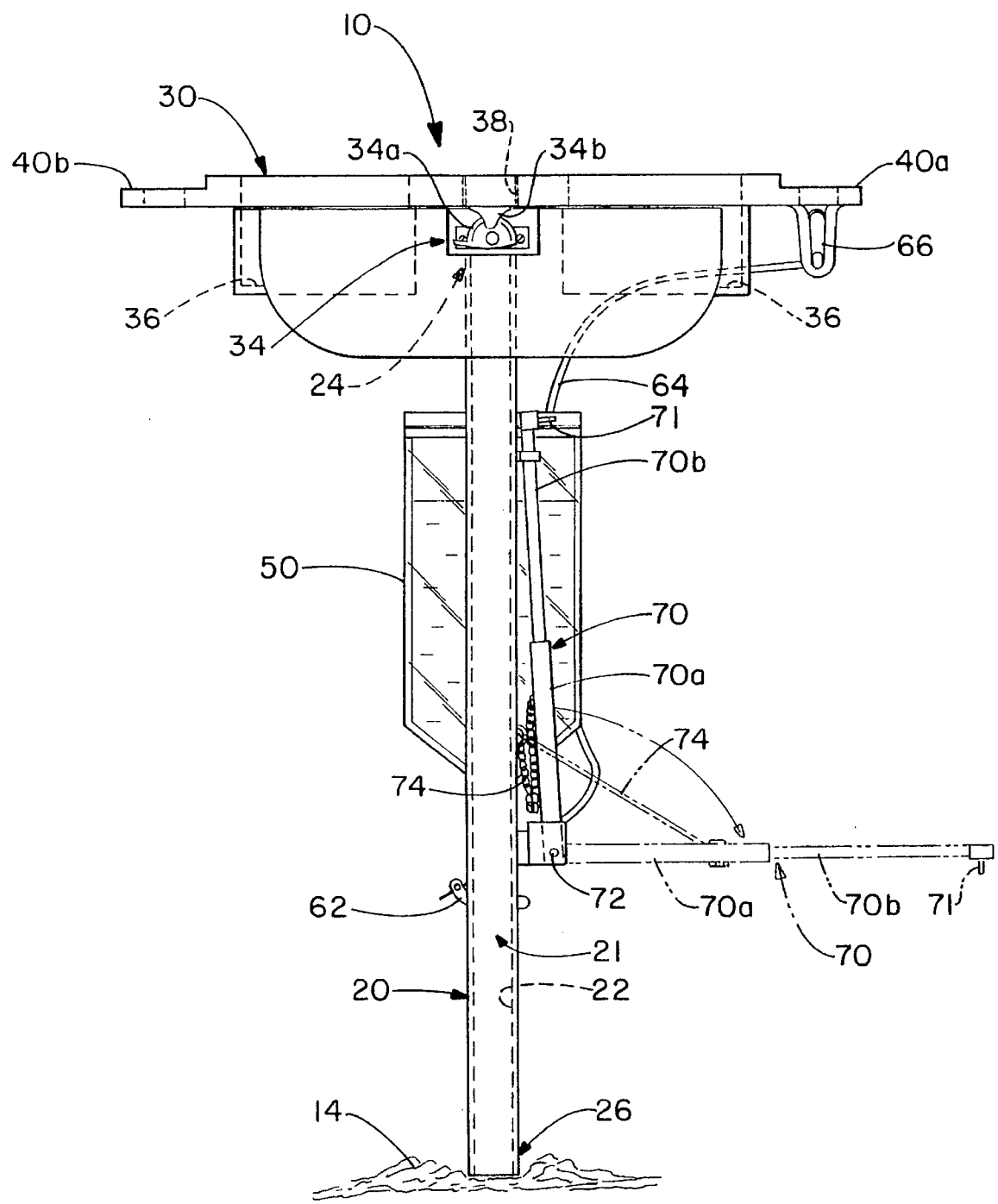
FIG. 5 is a rear elevational view showing a garden tool in accordance with the present invention in its operative position.

In operation, a garden tool 10 in accordance with the present invention may be utilized by an operator of the apparatus 10, such as a gardener, to easily and quickly plant plants 12. The apparatus 10 is most preferably utilized in soil that has already been cultivated and is therefore more easily penetrated by the open lower end 26 of the planting member 20. In general, to utilize the apparatus 10, one places a plurality of plants 12, which may be of any variety, in recesses 36 such that plant carrying tray 30 supports plants 12 in a position where they are easily accessible to an operator of the apparatus 10 as shown in FIG. 1. It should be recognized that when tray 30 is in its storage location as shown in FIG. 4, the apparatus 10 may be laid down on a horizontal surface, thereby providing an easy position for loading plants 12 onto tray 30. Once the tray 30 is loaded with plants 12, the operator may grasp the hand grips 40a, 40b and lift the tray 30 in an upward direction, thereby causing planting member 20 to pivot to its operative vertical position. The operator may then operate latch 34 to secure the tray 30 and planting member 20 relative to one another in their respective operative positions as shown in FIGS. 1–3, and 5.

Once the apparatus 10 is in its operative position with plants 12 loaded into plant carrying tray 30 and positioned in a garden or the like including cultivated soil 14, the operator, grasping hand grips 40a, 40b and standing at the rear of the apparatus 10 (as shown, the rear of the apparatus 10 is the side opposite the tank 50), forces the forward lower end 26 of the planting member 20 into the cultivated soil 14 a suitable distance, which may be several inches, for example. The operator can use his or her foot, knee, or leg to apply forward and downward pressure on the rear surface 21 of the planting member 20 to force the lower end 26 of the member 20 more deeply into the soil 14, and a knee pad or the like may be provided for this purpose. Also, the lower end 26 of the planting member 20 can be provided with a plow-like shape to facilitate its insertion into the soil 14. With the lower end 26 of the planting member 20 inserted into the soil 14 as described, the operator may then remove a plant 12 from its position in recess 36 of tray 30 and insert the plant into bore 22 of planting member 20 at the open upper end 24 thereof (FIG. 1). As mentioned, tray 30 includes an aperture 38 in registry with open upper end of planting member 20 to allow a plant 12 to be easily inserted into bore 22 of member 20 at open upper end 24 thereof. The plant 12 will fall downward through the bore 22, under the force of gravity, toward the lower end 26 of the member 20 until it finally comes to rest against the soil 14 (FIG. 2). Water or fertilizer may be dispensed from tank 50 through pipe 60 onto the plant 12 as is described above, if desired, and the apparatus 10 is then lifted upward, causing planting member 20 to be pulled from the soil 14, leaving the plant 12 behind. The operator of the apparatus 10 may use his or her foot to push additional soil around the roots of the plant 12 to ensure that the plant 12 is properly planted in the soil 14. The planting operation may be repeated as often as desired until the plant carrying tray 30 is empty of plants 12, at which time additional plants 12 may be placed on the tray 30 until the planting is complete.

The garden tool apparatus 10 also preferably includes a plant positioning guide such as a plant positioning guide arm 70 including a fixed portion 70a and a telescoping portion 70b slidably engaged with fixed portion 70a so as to be selectively extensible therefrom. Plant positioning guide arm 70 is pivotally connected to elongated planting member 20 or to another suitable location of apparatus 10 by means of a hinge 72 allowing plant positioning arm 70 to be selectively moved from a storage position, shown in FIGS. 2 and 5, to an operative position as is shown in FIG. 1 and in phantom in FIG. 5. In operation, telescoping portion 70b of plant positioning guide arm 70 is extended from fixed portion 70a any desired distance such that the distance between adjacent rows of plants planted with the apparatus 10 will approximately equal the length of the plant positioning arm 70. The operator can ensure that a plant 12 being planted with the apparatus 10 is neither too far nor too close to an adjacent row of plants by positioning the tip 71 of arm 70 over a plant in an adjacent row to the row being planted. When not in use, plant positioning arm 70 may be folded into its storage location.

Figure 6:
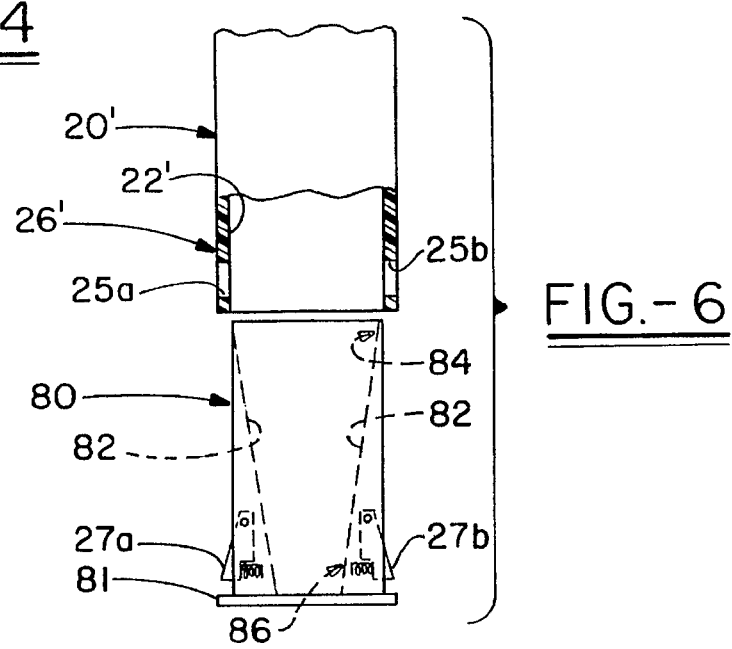
FIG. 6 is an enlarged elevational view of the lower portion of an alternative embodiment of a garden tool in accordance with the present invention showing an insert member for reducing the exit bore of the apparatus.

FIG. 6 shows an alternative design for the lower portion 26 of planting member 20, wherein planting member 20 has been replaced by planting member 20' including a lower end portion 26', and a bore 22' formed therethrough in a manner similar to that described above in relation to member 20 and bore 22 formed therethrough. Lower portion 26' of planting member 20' includes first and second apertures 25a, 25b formed through the walls thereof, and an insert 80 is provided and has a cross-sectional size and shape such that insert 80 may be inserted in bore 22' at open lower end 26' of planting member 20'. Insert 80 includes first and second spring-loaded tabs 27a, 27b which are sized and positioned such that when insert 80 is properly positioned in bore 22', tabs 27a, 27b will extend through apertures 25a, 25b, respectively, thereby selectively preventing insert 80 from being removed from its position within bore 22' until tabs 27a, 27b are depressed. Insert 80 includes a flange 81 to prevent it from being inserted too far into bore 22'. Insert 80 includes a bore 82 formed therethrough which is tapered from a larger diameter at its upper end 84 to a smaller diameter at its lower end 86. In this manner, an operator of the apparatus 10 may utilize an insert 80 to narrow the exit diameter of the bore 22' at the lower end 26' of planting member 20'. Those skilled in the art will recognize that an apparatus 10 may be provided with several different inserts 80 having bores 82 formed therethrough of different diameters. A particular insert may be utilized to provide an exit from bore 22' at lower end 26' of member 20' that is the proper size relative to the particular plants 12 being planted using the apparatus 10. Larger size plants require an unobstructed bore 22, 22', and therefore, no insert 80 is needed. However, to ensure that smaller plants do not tumble or otherwise fail to properly exit bore 22, 22', an insert 80 can be utilized to provide an exit from bore 22' that is the proper size—i.e., large enough to prevent a plant 12 from becoming lodged in the bore 22', yet small enough to ensure that plant 12 is planted in soil 14 in its upright position.

Those skilled in the art will recognize that the apparatus 10, and the various components thereof may be manufactured from a wide variety suitable materials, including wood, plastic, and metal. Also, the size and shape of the elongated planting member 20, including the length thereof and the bore 22 formed therethrough may vary depending on the type and size of plants being planted using the apparatus 10. In general, the foregoing description has set forth the preferred embodiment of the invention in particular detail and it must be understood that numerous modifications, substitutions and changes can be undertaken without departing from the true spirit and scope of the present invention as defined by the ensuing claims.

What is claimed is:

1. A garden tool apparatus for planting plants in cultivated soil, said garden tool comprising:

an elongated planting member having an upper end, a lower end, and a bore formed therethrough from said upper end to said lower end such that said upper end and said lower end of said member are open to said bore;

a plant carrying tray connected to said elongated planting member, adjacent to said open upper end; and, a hand grip by which an operator of said garden tool may grasp and operate said garden tool.

2. A garden tool apparatus as recited in claim 1, wherein said plant carrying tray is hingedly connected to said elongated planting member such that said plant carrying tray pivots between an operative position and a storage position.

3. A garden tool apparatus as recited in claim 2, further comprising a latch mechanism for securing said plant carrying tray in said operative position.

4. A garden tool apparatus as recited in claim 2, wherein said plant carrying tray includes an aperture formed therethrough, said aperture positioned through said tray such that said aperture is in registry with said open upper end of said elongated planting member when said tray is in its operative position.

5. A garden tool apparatus as recited in claim 1, wherein said plant carrying tray includes at least one recess formed therein to receive at least one plant to be planted.

6. A garden tool apparatus as recited in claim 1, wherein said garden tool comprises first and second hand grips positioned at opposite sides of said plant carrying tray.

7. A garden tool apparatus as recited in claim 6, wherein said first and second hand grips are formed in said plant carrying tray.

8. A garden tool apparatus as recited in claim 1, further comprising:

at least one tank for containing a quantity of a liquid, said at least one tank including an outlet;

a conduit positioned between said outlet of said at least one tank and said bore formed through said elongated planting member to communicate liquid from said at least one tank, through said tank outlet, and into said bore formed through said elongated planting member; and, a valve for selectively blocking fluid communication through said conduit from said at least one tank;

such that liquid from said at least one tank is selectively communicated through said conduit from said at least one tank into said bore formed through said elongated planting member.

9. A garden tool apparatus as recited in claim 8, wherein said valve is operatively connected to a control lever by a cable, said lever positioned for operation by an operator of said apparatus.

10. A garden tool apparatus as recited in claim 1, further comprising a plant positioning guide connected to said apparatus for locating a plant being planted with said apparatus a predetermined distance from another plant.

11. A garden tool apparatus as recited in claim 10, wherein said plant positioning guide is an arm, pivotally connected to said elongated planting member.

12. A garden tool apparatus as recited in claim 11, wherein said arm comprises a fixed portion connected to said elongated planting member and a telescoping portion slidably engaged with said fixed portion, said telescoping portion selectively extensible from said fixed portion to vary the length of said arm.

13. A garden tool apparatus as recited in claim 1, further comprising at least one insert for insertion into said bore formed through said elongated planting member at said open lower end of said member, said insert including a tapered bore formed therethrough such that said insert reduces the exit size of said bore of said elongated planting member at said open lower end thereof.

14. A garden tool apparatus as recited in claim 13, wherein said lower end of said elongated planting member includes at least one aperture formed through a wall thereof, and wherein said insert includes at least one tab extending therefrom, such that said at least one tab of said insert engages said at least one aperture when said insert is inserted into said bore of said elongated planting member, thereby selectively securing said insert within said bore.

* * * * *